US008177625B2

(12) United States Patent
Borissov et al.

(10) Patent No.: US 8,177,625 B2
(45) Date of Patent: May 15, 2012

(54) GAMING MACHINE WITH MULTIPLE GAMES HAVING INDIVIDUAL AND COMBINED PAYLINES

(75) Inventors: Milo Borissov, Sharjah (AE); Rossi McKee, Sofia (BG); Hristo Lazarov, Sofia (BG); Ognian Dimitrov, Sofia (BG)

(73) Assignee: Casino Technology AD (BG)

( * ) Notice: Subject to any disclaimer, the term of this patent is extended or adjusted under 35 U.S.C. 154(b) by 644 days.

(21) Appl. No.: 12/291,514

(22) Filed: Nov. 10, 2008

(65) Prior Publication Data

US 2009/0215521 A1 Aug. 27, 2009

Related U.S. Application Data

(60) Provisional application No. 61/002,688, filed on Nov. 9, 2007.

(51) Int. Cl.
*A63F 13/00* (2006.01)

(52) U.S. Cl. .......... 463/20; 463/16; 273/143 R; 273/292

(58) Field of Classification Search .................... 463/16, 463/20, 35-30; 273/143 R, 292
See application file for complete search history.

(56) References Cited

U.S. PATENT DOCUMENTS

| | | | | |
|---|---|---|---|---|
| 6,120,378 | A | 9/2000 | Moody et al. | |
| 6,159,095 | A | 12/2000 | Frohm et al. | |
| 6,652,378 | B2 | 11/2003 | Cannon et al. | |
| 6,676,511 | B2 | 1/2004 | Payne et al. | |
| 6,832,957 | B2 | 12/2004 | Falconer | |
| 2001/0036856 | A1 | 11/2001 | Payne et al. | |
| 2002/0065124 | A1* | 5/2002 | Ainsworth | 463/20 |
| 2002/0183105 | A1* | 12/2002 | Cannon et al. | 463/16 |
| 2005/0101379 | A1 | 5/2005 | Falconer | |

* cited by examiner

*Primary Examiner* — Masud Ahmed
(74) *Attorney, Agent, or Firm* — Weide & Miller, Ltd.

(57) ABSTRACT

A gaming machine is configured to present multiple individual games to a player. The individual games each have a plurality of symbol locations which display symbols to a user. The symbols displayed in the symbol locations corresponding to one or more primary paylines are compared to predetermined winning symbol combinations to declare a winning outcome. One or more secondary paylines corresponding to symbol locations in more than one of the individual games may be compared to the winning symbol combinations to declare a winning outcome as well. The winning symbol combinations may be defined and presented to players by a paytable. The primary and secondary paylines may be fixed or selected by the player and may constitute a bonus win having a higher payout.

9 Claims, 3 Drawing Sheets

GAMING MACHINE WITH MULTIPLE GAMES HAVING INDIVIDUAL AND COMBINED PAYLINES

RELATED APPLICATION DATA

This application claims priority to U.S. Provisional Application Ser. No. 61/002,688 filed Nov. 9, 2007.

FIELD OF THE INVENTION

The present invention relates to wager-type games.

BACKGROUND OF THE INVENTION

Slot-type gaming machines are well-known and have been popular for years. These games have their origin in old mechanical spinning reel games where a player attempted to receive certain combinations of symbols as a result of the spin of the reels. More recently, these games have been implemented on video gaming machines where the symbols are generated and displayed on a video display.

The problem with these games is that the basic configuration of the game is relatively simple, and the game offers little player interaction. In order to make these games exciting, gaming manufacturers have recently begun offering "themed" slot type games. For example, popular themed gaming machines currently include Playboy®, Star Wars® and others. Associating a "theme" with the game does not, however, generally change the method of game play or the minimal player interaction offered thereby.

A slot-type game which provides a higher level of player excitement and interaction is thus desired.

SUMMARY OF THE INVENTION

The present invention comprises a method of playing a game and a gaming machine configured to present a game.

In one embodiment of a game, multiple sets or games are played. Each set or game may comprise the display of symbols in symbol positions. The outcome of each set or game is evaluated independently. In one embodiment, one or more primary paylines are associated with the symbols of each set or game. Combinations of symbols along a primary payline of the each individual game are evaluated to determine if any predetermined winning combinations of symbols are displayed.

In addition, winning outcomes are evaluated as to symbols appearing in multiple of the sets or games. In one embodiment, at least one secondary payline is associated with at least one symbol in each of two or more of the multiple sets or games. Combinations of symbols along the secondary payline are evaluated to determine if any predetermined winning combinations of symbols are displayed.

Further objects, features, and advantages of the present invention over the prior art will become apparent from the detailed description of the drawings which follows, when considered with the attached figures.

DETAILED DESCRIPTION OF THE INVENTION

The invention is a method of presenting and playing a game. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a method of playing a game in which a plurality of symbols are displayed. The game is a "slot" type game in which a player attempts to receive certain combinations of slot symbols. In a preferred embodiment of the invention, the game comprises multiple slot games, each slot game having its own set of symbols which are evaluated for winning combinations of symbols. In addition, one or more combinations of symbols from two or more of the slot games are evaluated for winning combinations of symbols.

Figure 1:
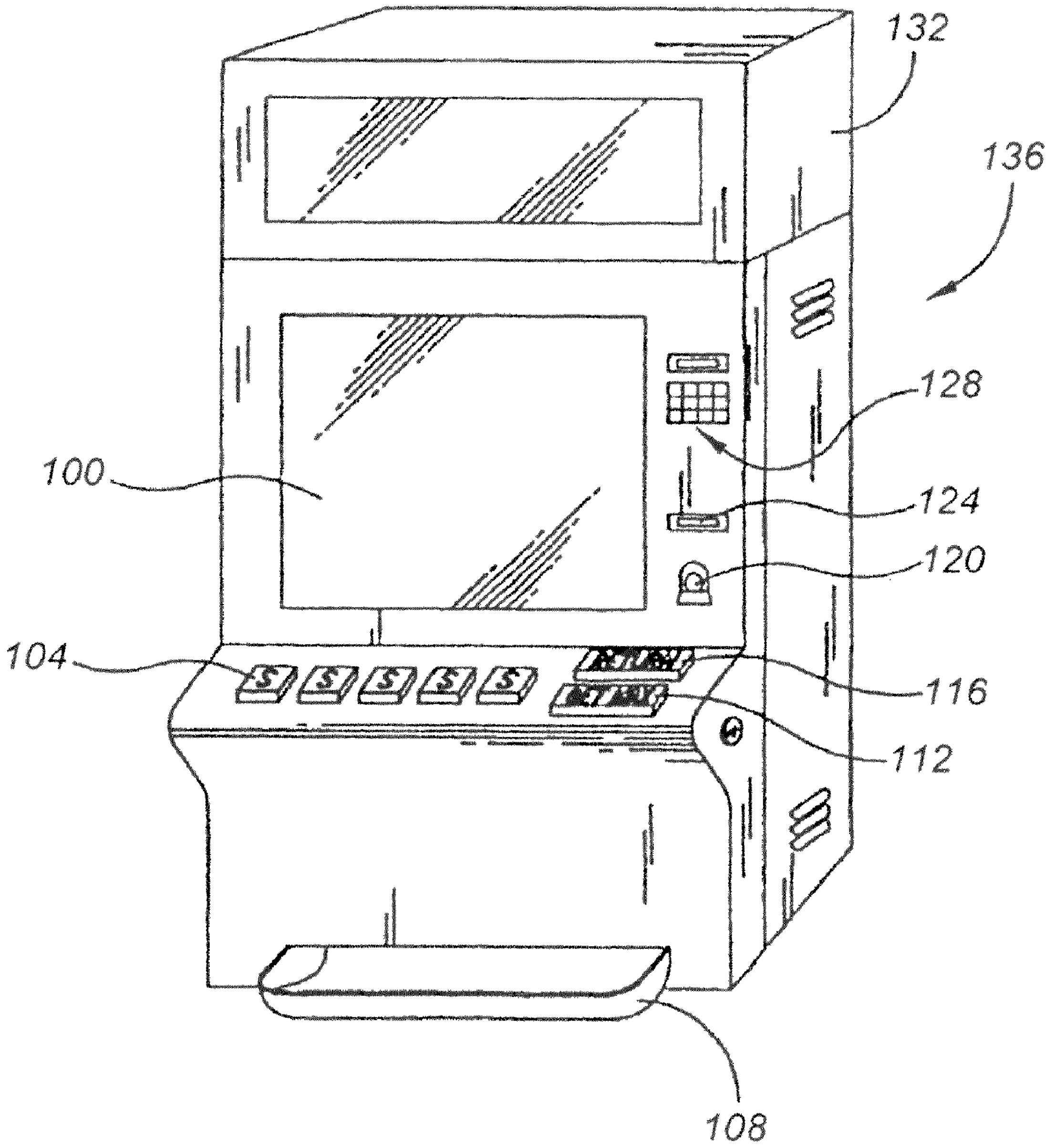
FIG. 1 illustrates a gaming machine of the type which may be used to implement a game in accordance with the present invention.

In a preferred embodiment, the game of the invention is presented to a player with a gaming machine. FIG. 1 illustrates one embodiment of a gaming machine 136 in accordance with the invention. As illustrated, the gaming machine 136 includes a housing 132 for enclosing/supporting various components of the gaming machine. The housing 132 have a variety of configurations. In one embodiment, the housing 132 is configured to the machine has an "upright" configuration. The machine 136 might also be configured as a "slant"-type, "bar-top" or have other forms.

In one embodiment, the gaming machine 136 is configured as a "video" type gaming machine, the machine including at least one display 100 for displaying game information to a player. As described below, this game information may include playing card and non-playing card symbols or indicia.

The gaming machine 136 may include other means for providing information to a player. For example, speakers (not shown) or other devices may be provided for generating sound associated with the game. The gaming machine 136 may also include lights, printed instructions and other displays/display devices.

In one embodiment, a player must make payment in order to be entitled to play the game. Preferably, the game is presented as a wagering type game, and a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the gaming machine 136 may include a bill validator/acceptor 124 for accepting paper currency and a coin acceptor 120 for accepting coins. Other means of payment, such as a credit card reader, may be provided. An award of winnings in the form of coins may be paid to the player via a coin tray 108.

Preferably, the gaming machine 136 includes means for a player to provide input. In one embodiment, this means comprises one or more buttons. For example, a plurality of reel "spin" or "select" buttons 104 may be provided for permitting a player to hold/select cards in a hand. A bet one button 116 and bet max button 112 are provided for a player to select the amount to bet on a particular game. Other means of input may be provided, such as a touch-screen display and other devices now known or later developed.

A game controller (not shown) is provided for controlling the various devices of the gaming machine and for providing game information. For example, the game controller may be arranged to generate video and audio data for presentation by the display and speakers of the gaming machine 136. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 108 for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

It will be appreciated that the gaming machine 136 may have a variety of configurations, and that the gaming machine 136 illustrated and described above is but an example of a device for implementing the game of the present invention. For example, in one or more embodiments, the gaming machine 136 may be associated with a network and receive game information remotely and may transmit information, such as payout and game play information, to a remote location. For example, a remote master controller may generate game information which is transmitted over a communication link to the gaming machine 136. That information may be utilized by a local controller or processor to present the game, such as by displaying game play data or information.

As indicated, in one embodiment, game information is displayed by a video display 100 to a player. That display may be of a variety of types, including CRT, LCD, plasma and others. The gaming machine 136 may also include more than one video display.

In one embodiment, as described in more detail below, game information which is presented to a player comprises simulated reels displaying game symbols. As indicated, these symbols may be displayed in graphical representation by the display.

In another embodiment, the gaming machine 136 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference.

The gaming machine 136 may have other configurations, including other features. For example, the gaming machine 136 may include a player tracking device 128, such as a card reader and associated keypad. Such player tracking devices are well known and may permit the game operator to track play of players of the gaming machine. The tracked play may be utilized to offer player bonuses or awards.

In one embodiment, the gaming machine 136 may be configured to dispense media, such as printed paper tickets, which have associated value. For example, winnings or unused credits may be returned to the player via a printed ticket having value or associated value. In one embodiment, the gaming machine 136 might also be configured to accept such media for providing credit for game play. Such systems are well known and thus not described in detail herein.

It will also be appreciated that the games of the invention may be presented or played as table games, such as using cards marked with playing card and symbol information as detailed below.

As indicated, in one embodiment, the game of the invention is played or presented as wagering type games in which a player must place a wager in order to play the game for an opportunity of winnings. In other embodiments, the game may be played for fun or prizes. In such event, the player may be permitted to play the game for free or may be required to make payment to play the game.

As indicated above, a player may provide value to the gaming machine 136 or machine operator in a number of ways, including with coins or bills. The player might also be permitted to provide value remotely.

Once the player provides value, the player preferably places a wager to play the game. This may be accomplished, in one embodiment, by the player pressing the "bet one" button 116 or the "bet max" button 112, or by other means.

Preferably, in response to the player placing a wager, a plurality of symbols or indicia are displayed to the player. In one embodiment, the controller of the gaming machine 136 is configured to randomly select or generate the symbols which are to be displayed. Such methods of generation/selection are well known and may include the generation of random numbers which correspond to symbols which are to be displayed.

In general, in accordance with one embodiment of the invention, multiple sets of symbols are displayed and the outcome of the game is determined with reference to the symbols in each of the sets and preferably with reference to one or more combinations of symbols in two or more of the sets. In a preferred embodiment, each set of symbols is played as a separate game.

In one embodiment, multiple games of slot symbols are displayed and evaluated for winning combinations, such as along one or more paylines corresponding to each individual game. In addition, the symbols of one or more of the games are evaluated to determine additional winning combinations, such as the symbols along one or more secondary paylines which extend through more than one of the games.

Figure 2:
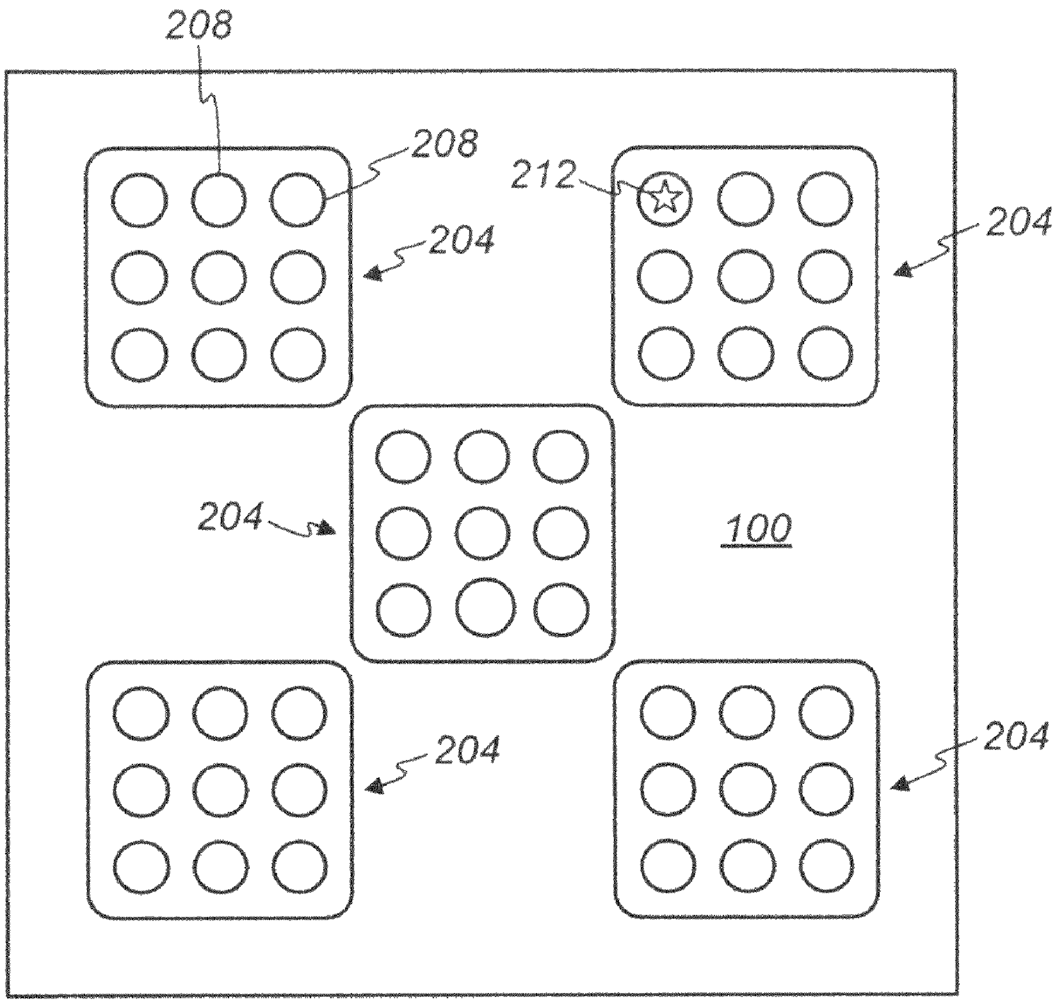
FIG. 2 illustrates a screen display of an embodiment in accordance with the present invention.

Referring to FIG. 2, the symbols 212 of an individual game 204 may be displayed in a variety of ways. In one embodiment, display of the symbols 212 is via the video display 100. As indicated above, in another embodiment, the display of the symbols 212 could be by one or more physical devices, such as physical reels, or a combination of physical reels and virtual reels displayed by a display. Preferably, the symbols 212 will be displayed at predetermined symbol locations 208 as defined by each game 204. In the case of virtual or physical reels, the placement of the reels determines the symbol locations 208. It is contemplated that symbol locations 208 may be placed anywhere on the display 100 or the physical device, and may be defined by placeholders or indicators such as but not limited to boxes, circles, shapes, or other graphics. In one embodiment, the symbol locations or positions are arranged into rows and columns, i.e. matrix form, but the positions may have a variety of arrangements (and the arrangement of the symbols locations for each individual game may vary).

Preferably, the outcome of an individual game 204 is dependent upon the symbols which are generated and displayed to the player. In particular, certain combinations of symbols 212 preferably comprise predetermined winning combinations of symbols. Other combinations of symbols 212 are losing or non-winning combinations. In some embodiments, a paytable, which may or may not be displayed to a player, defines one or more winning combinations of symbols. The paytable may be displayed by any method of presentation to a player, such as printed text, a separate menu, secondary display or the like. It will be appreciated that the winning combinations for each individual game 204 may be the same or different.

In one or more embodiments, not all of the displayed symbols 212 or all of the potential combinations of displayed symbols are compared to the winning combinations of symbols to determine a winning outcome. In a preferred embodiment of the invention, only the symbols associated with one or more paylines are evaluated. Thus, a winning outcome may be declared where the symbols displayed at the symbol locations along a particular payline are a winning combination.

Preferably, a payline preferably defines or includes at least two symbol positions. For example, in a three reel (virtual or physical) slot machine where symbols 212 are displayed in nine symbol locations 208 in three columns and three rows, a payline may correspond to the symbols in a diagonal from the top left to the bottom right, or the top right to the bottom left, or both. In addition, in some embodiments, a payline may correspond to symbol locations 208 horizontal or vertical to one another. It is contemplated that a payline does not have to be a straight line and thus may include corners, angles, curves, and the like. In addition, there may be a plurality of paylines for each game 204 and in some embodiments, particular paylines may be selected by a player based on the game being played, the amount wagered, or other factors.

The paylines may be representative or may be displayed, either permanently or temporarily. For example, the paylines of a particular game 204 may be presented to the user as a graphic or legend somewhere on the physical device. In other embodiments, the paylines may be permanently visible such as by continuously displaying them on a video display or by printing them on a transparent overlay covering the symbol locations 208 of a particular game 204. Alternatively, the paylines may be temporarily visible such as in the case of a video display 100 which may be configured to temporarily display one or more paylines. For example, a game 204 may allow its players to select which paylines to play and thus the selected paylines may be presented to the player while the unselected paylines are not presented or invisible to the player. In this case, winning outcomes may be determined using at least one of or only the selected paylines. Each game may have as few as one payline, or multiple paylines.

Figure 3:
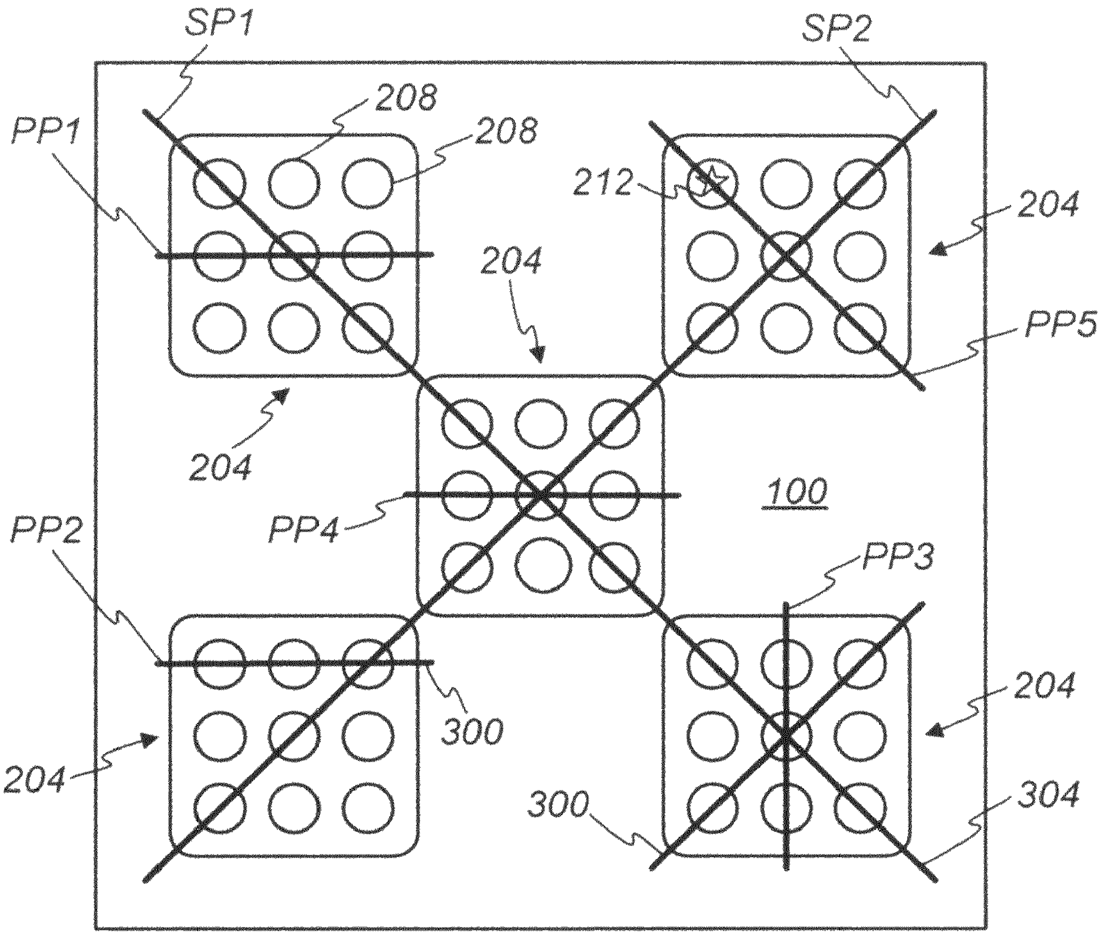
FIG. 3 illustrates a screen display with paylines of an embodiment in accordance with the present invention.

In one preferred embodiment as shown in FIG. 3, at least two individual games 204 are provided or presented to a player. Preferably, these games are presented or played at substantially the same time (such as by being simultaneously displayed).

In a preferred embodiment, each game involves the display of two or more symbols 212. Preferably, the displayed symbols are randomly selected from a group of at least two different symbols. In one embodiment, the symbols used in the play of each game may be unique or they may be the same.

In one embodiment, a symbol 212 is generated and displayed in each symbol position 208 of the game (such as by video generation or spinning and stopping of a physical reel). Each game 204 has its own one or more primary paylines 300 which correspond to a plurality of symbol locations 208 within the individual game 204. The outcome of each game 204 or other individual set of symbols is then independently determined relative to the symbols which are associated with the one or more paylines of that game.

For example, FIG. 3 illustrates an embodiment of the game of the invention in which five games 204 are presented to a player, those five games arranged in a "star" pattern. Each game 204 has its own symbols 212 and one or more primary paylines 300. In one embodiment, the outcome of the first game is evaluated relative to the symbols along primary payline PP1. A second game is evaluated relative to the symbols along primary payline PP2. A third game is evaluated relative to symbols along a primary payline PP3. A fourth game is evaluated relative to symbols along a primary payline PP4, and the fifth game is evaluated relative to symbols along a primary payline PP5. It will again be appreciated that in this embodiment, there is only one primary payline 300 per game, but there could be two or more primary paylines per game, and the number of primary paylines for each game might vary. Second, the configuration of the primary paylines 300 may be the same or, as illustrated, different.

In accordance with a preferred embodiment of the invention, in additional to evaluation of symbols 212 of each game 204, symbols from two or more of the games or sets are evaluated for potential winning outcomes. In one embodiment, the symbols 212 from multiple of the games 204 or sets are evaluated, such as along one or more secondary paylines 304 corresponding to a plurality of symbol locations 208 of more than one of the individual games 204. Thus, in addition to offering a potential winning for each individual game 204, a winning outcome may also be declared for winning combinations of symbols 212 along any secondary payline 304 which, as stated, includes symbols from a plurality (at least two) of the individual games 204. This adds to the excitement and player interaction and encourages players to place wagers.

As with the primary paylines 300, the number of secondary paylines 304 (or other secondary combinations of symbols from two or more of the games or symbol sets) may vary. FIG. 3 illustrates an embodiment in which there are two secondary paylines SP1 and SP2. There could be as few as one secondary payline 304 or more than two. In the embodiment illustrated, the two secondary paylines SP1, SP2 include multiple symbols 212 from three of the games 204. However, the secondary paylines 304 could include as few as one symbol 212 from the multiple games 204, and could include a symbol or symbols from as few as two, or three or more (or all) of the games. Of course the arrangement or configuration of the secondary paylines 304 might vary depending upon the arrangement or placement of the symbol locations 208 of the games 204. In the illustrated embodiment, the individual game symbol locations 208 lend well to "diagonal" secondary paylines 304. As illustrated, the secondary paylines SP1, SP2 form an "X" through the sets of symbols.

Paylines may be selected by the player. Thus, in one embodiment of the invention, one or more of the primary paylines 300, secondary paylines 304, or both, may be selected by a player (such as prior to a spin or other display of symbols 212 or at another time). The number of primary paylines 300 and/or secondary paylines 304 which are played may depend upon various factors, such as the size of the player's wager. For example, a base wager might entitle the player to a single primary payline 300 for each game and a single secondary payline 304. In other embodiments, a player might be required to place an additional wager over a base wager in order to be entitled to play any secondary payline 304 or additional primary or secondary paylines 300,304.

In accordance with the present invention, a winning outcome may be declared for any combinations of symbols 212 along a primary payline 300 or a secondary payline 304 which are predetermined winning combinations (such as defined by the paytable(s)). In one or more embodiments, the winning combinations for the primary paylines 300 may be the same as or different from the winning combinations for the secondary paylines 304. In addition, winning combinations for primary paylines 300 and secondary paylines 304 may have different numbers of symbols 212, because the primary and secondary paylines may include different numbers of symbols (it is noted that a winning combination of symbols may be as few as one particular symbol, or may be a combination of symbols in the same number as the number of symbols along the payline—as one example, if a primary payline includes three symbol positions, a winning combination might be three $ signs, or just the appearance of one $ sign in any position along the payline).

Individual paylines, whether primary or secondary, may have special meaning or value such as a bonus assigned to them as well. For example, diagonal paylines (or any other payline) could be designated bonus paylines with payout amounts higher than those of ordinary paylines. Additionally, certain winning combinations may be designated bonus winning combinations and similarly have payouts higher than ordinary winning combinations. For example, having all 7's on a payline could entitle a player to a higher payout amount. It is also contemplated that various combinations of bonus paylines and bonus winning combinations may be used in one or more embodiments. For example, a bonus winning combination along a bonus payline could have a high payout amount in one or more embodiments.

Play of the primary paylines 300 and secondary paylines 304 may be simultaneous or sequential. Generally, play of a payline starts at the moment a wager is made and ends when it is evaluated against the paytable. However, some embodiments may have different starting and ending points. For example, play of a payline may start when it is selected by a player (for example, the symbols 212 may be displayed and then a player may place a first wager to cause a first primary payline 300 to be displayed, a second wager to have a first secondary payline 304 displayed, etc.). In some embodiments, the secondary paylines 304 may be used as a bonus game played subsequent to the primary paylines 300, or vice versa. For example, a player may be required to obtain a certain winning outcome relative to the one or more individual games 204 in order for the secondary payline feature to be activated. In addition, the individual games 204 themselves may be played simultaneously or sequentially with their corresponding primary paylines 300 being evaluated after each one or all the individual games 204 have been played. Also, additional wagers may be collected prior to the play of additional individual games 204, primary paylines 300, secondary paylines 304, or a combination thereof. It is contemplated that the various possibilities of wagering opportunities and order of play discussed herein as well as other possibilities may be varied and combined within the present invention.

In some embodiments, the evaluation of all primary paylines 300 for winning outcomes in one or more individual games 204 may be prevented, in effect making one or more of the individual games unplayable. This may occur, for example, when a player is permitted to chose which of the individual games 204 to play, or when the rules prevent individual games from becoming playable until a wager of sufficient value is placed. For example, relative to the embodiment in FIG. 3, a player may be required to place a wager to play each individual game 204. If a player places only three wagers, only three of the games such as those having primary paylines PP1, PP4 and PP3 may be displayed and played. In that instance, only the single secondary payline SP1 may be playable.

In the embodiment of FIG. 3, the gaming machine comprises a main display 100 with five individual games 204 arranged in a X shaped pattern. The display 100 is a video display displaying virtual reels and may include touch screen input capability. Each game 204 in this embodiment has three reels with three symbol locations 208 for a total of nine symbol locations arranged in three columns. Each game 204 also has five primary paylines 300, three horizontal and two diagonal. In addition, two diagonal secondary paylines 304 are provided. The secondary paylines 304 in this embodiment entitle a player to a bonus win having a higher payout. The secondary paylines 304 are activated when the player plays the maximum number of primary paylines 300 (i.e. all 25 primary paylines), but may be activated for other reasons or at other times. If nine identical symbols 212 or other winning combination appears along any diagonal secondary payline 304, the player is entitled to a bonus win such as but not limited to 50,000 to 100,000 times the amount of the player's bet per line. Other bonuses are also contemplated, such as but not limited to free games, or games where wins are multiplied by a factor. These bonuses may be presented to a player randomly or in response to a predefined event. Finally, this embodiment may be varied or combined with other aspects of the present invention disclosed herein, and the other embodiments disclosed herein may similarly by varied or combined with various aspects of the present invention disclosed in this embodiment.

Several features and advantages of the invention will now be appreciated. In accordance with the invention, a player has an opportunity to play one or more base or individual games. Each individual game is evaluated for potential winning combinations. In addition, however, the player is provided an opportunity for an additional win based upon symbols spanning or including more than one of the individual games. This secondary opportunity provides a chance to win independent of the outcomes of the base or individual games.

It will be appreciated that the type of symbols which are utilized in the play of the game of the invention may vary. For example, the symbols may be slot-type symbols known in the art. The symbols might also be card symbols. For example, the cards positioned along a payline might be evaluated to determine if they form a winning poker hand.

In one embodiment, winnings are awarded for one or more winning combinations. The amount of winnings may be defined with reference to the paytable(s) or other factors. For example, different winning combinations may have different winning amounts. The winning amounts may be awarded as credits, monies, prizes or the like. As indicated, winnings for particular combinations may be enhanced, such as multiplied, if the outcome is a "bonus" outcome (such as associated with a particular payline, such as a secondary payline).

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method of presenting a game at a gaming machine comprising the machine-implemented steps of:

defining at least one first symbol matrix and at least one second symbol matrix, each symbol matrix defining a plurality of symbol positions at which game symbols may be displayed;

defining at least one primary pay line associated with a plurality of symbol positions of only said first symbol matrix;

defining at least one primary pay line associated with a plurality of symbol positions of only said second symbol matrix; wherein the first symbol matrix is an independent of the second symbol matrix and both the first and the second symbol matrix can be independently evaluated for a win;

defining at least one secondary pay line associated with at least one symbol position of said first symbol matrix and at least one symbol position of said second symbol matrix to determine an additional win;

accepting a wager from a player of said gaming machine, wherein if said wager comprises a first wager mount, activating one or more of said primary pay lines but not said at least one secondary pay line, and if said wager comprises a second wager amount, said second amount being greater than said first amount, activating each primary pay line and at least one secondary pay line;

displaying game symbols in said symbol positions of said at least one first symbol matrix and said at least one second symbol matrix;

awarding winnings for winning combinations of symbols positioned in symbols positions along each active pay line.

2. The method in accordance with claim 1 comprising defining five symbol matrices, said matrices arranged in an X pattern.

3. The method in accordance with claim 1 wherein a first, a second, a third, a fourth and a fifth symbol matrix each have a plurality of rows and columns of symbol positions and two opposing diagonals wherein said first and second matrices have their rows aligned, said fourth and a fifth matrices have their rows aligned, said first and fourth matrices have their rows aligned, said second and fifth matrices having their rows aligned, and said first, third and fifth matrices have their diagonals aligned and said second, third and fourth matrices have their diagonals aligned.

4. The method in accordance with claim 3 wherein at least one first secondary pay line comprises the symbol positions along said aligned diagonals of said first, third and fifth matrix and at least one second secondary pay line comprises the symbol positions along aligned diagonals of said second, third and fourth pay lines.

5. The method in accordance with claim 4 wherein each of said first, second, third, fourth and fifth symbol matrices each define nine symbol locations, wherein each symbol position diagonal of said first, second, third, fourth and fifth matrix comprises three symbol positions.

6. The method in accordance with claim 1 wherein a primary diagonal pay line corresponds to each symbol position diagonal of each symbol matrix.

7. The method in accordance with claim 6 wherein said first and second secondary pay lines completely overlap said diagonal primary pay lines.

8. The method in accordance with claim 1 wherein each of said first, second, third, fourth, and fifth symbol matrices define nine symbol positions arranged into three rows and three columns and wherein five primary pay lines are associated with the three rows and two diagonals of each matrix.

9. The method in accordance with claim 8 wherein said first amount comprises a wager of one to 24 credits activates a corresponding number of primary pay lines from one to 24 and a wager of 25 credits activates all primary pay lines and additionally each secondary pay line.

* * * * *